(12) United States Patent
Gale et al.

(10) Patent No.: US 6,287,428 B1
(45) Date of Patent: Sep. 11, 2001

(54) MOLD WITH INTEGRAL SCREEN AND METHOD FOR MAKING MOLD AND APPARATUS AND METHOD FOR USING THE MOLD

(75) Inventors: Gregory W. Gale, Napa; Jeffrey J. Haugen, Santa Rosa, both of CA (US)

(73) Assignee: Regale Corporation, Napa, CA (US)

( * ) Notice: Subject to any disclaimer, the term of this patent is extended or adjusted under 35 U.S.C. 154(b) by 0 days.

(21) Appl. No.: 09/385,914

(22) Filed: Aug. 30, 1999

(51) Int. Cl.[7] ........................................................ D21J 3/00
(52) U.S. Cl. ............................................. 162/382; 162/388
(58) Field of Search ................................. 162/218, 275, 162/382, 388, 411, 387, 389, 393, 394, 395, 277, 278, 279; 249/113, 141, 114.1; 419/36; 425/84, 388

(56) References Cited

U.S. PATENT DOCUMENTS 3,596,314  *  8/1971  Krugler ........................................ 18/5
5,431,784  *  7/1995  Miyamoto et al. ..................... 162/275
5,603,808  *  2/1997  Nishikawa ............................ 162/382
5,656,135  *  8/1997  Baker .................................... 162/388
5,976,457  * 11/1999  Amaya et al. .......................... 419/36
6,149,772  * 11/2000  Rasmussen ........................... 162/383

OTHER PUBLICATIONS

"Advanced Rapid Prototyping and Manufacturing Solutions" pamphlet by DTM, 1998.

* cited by examiner

*Primary Examiner*—Peter Chin
*Assistant Examiner*—Eric Hug
(74) *Attorney, Agent, or Firm*—Flehr Hohbach Test Albritton & Herbert LLP (57) ABSTRACT

A mold with integral screen comprising a body of material having a surface, the body has a grid-like pattern of vacuum holes extending through the body of material and opening through said surface and permitting a vacuum to be supplied to said surface, a screen overlying said surface, said screen and said body being formed of the same material as the body and being integral.

22 Claims, 7 Drawing Sheets

MOLD WITH INTEGRAL SCREEN AND METHOD FOR MAKING MOLD AND APPARATUS AND METHOD FOR USING THE MOLD

This invention relates to a mold with integral screen and method for making the same and particularly to a mold with integral latticework particularly useful as a tool for making articles from a fiber or pulp slurry to provide molded pulp parts and an apparatus and method for using the mold to produce molded pulp parts.

Molds have heretofore been provided for producing molded fiber products. Typically such molds have been called wet molds because they are dipped into a wet vat of a fiber or pulp slurry. Such a slurry typically is made from reclaimed paper such as newspapers, corrugated material and the like. Such molds often have been formed of aluminum to provide the desired surface or face through which vacuum holes extend. In such molds, the surface of the mold is typically covered with a screen such as of stainless steel which is sized to fit and cut and spot welded to conform precisely to the surface of the mold to provide the mold surface. Such screens are used to prevent the fibers from clogging the vacuum holes. Such a screen makes it possible to disperse the vacuum evenly over the entire surface of the mold and to prevent the fibers from clogging the vacuum holes. Such molds typically are quite expensive because of the time required to make the mold. In addition with such molds, the screens can readily tear during production requiring that the screens be repaired or replaced. There is therefore a need for a new and improved mold or die which overcomes the above-identified disadvantages.

In general, it is an object of the present invention to provide a mold or die that has a body with an integral screen or latticework and method for making the same which greatly reduces the time and expense required for making a mold suitable for molding products from fiber or paper pulp.

Another object of the invention is to provide a mold or die and method of the above character in which the die can be provided which has a body that is integral with the latticework and in which the body and the latticework can be fabricated at the same time by the use of the same material.

Another object of the invention is to provide a mold or die and method of the above character which can readily accommodate complex shapes.

Another object of the invention is to provide a mold or die and method of the above character which provides a molded product having unique surface texture provided by the latticework of the mold or die.

Another object of the invention is to provide a mold or die and method of the above character in which the architecture of the mold incorporates a body of the material which does not adversely affect operation of the latticework or screen.

Another object of the invention is to provide a mold or die and method of the above character in which the mold or die can be created with great precision.

Another object of the invention is to provide a die and integral screen of the above character which can be produced rapidly with great precision and at a greatly reduced cost.

Another object of the invention is to provide an apparatus and method for using the mold or die of the above character in which the molded pulp product can be dried by the use of heat on the mold before the product is transferred.

Another object of the invention is to provide an apparatus and method using the mold or die of the above character in which a vacuum can be maintained on the molded product while heat is being applied to the molded product.

Another object of the invention is to provide an apparatus and method of the above character in which the mold or die when in use will permit liquid to pass through the mold or while retaining the fibers of the molded pulp on the surface of the mold or die.

Another object of the invention is to provide an apparatus and method of the above character which is used for producing a precision molded product.

Additional objects and features of the invention will appear from the following description in which the preferred embodiments are set forth in detail in conjunction with the accompanying drawings.

In general, the die with integral latticework of the present invention is for use as a mold in making molded pulp products from a fiber slurry that comprises a body formed of a material. A latticework is carried by the body to provide a mold surface for making the molded pulp product. The latticework is provided with a plurality of means therein spaced substantially uniformly across the mold surface which are sized to permit a vacuum to be pulled therethrough but to prevent fibers from the pulp from being pulled therethrough so that the fibers from the slurry will build up on the latticework. Means is provided by the body for supporting the latticework on the body to provide a plurality of passages in communication with the openings in the latticework whereby a substantially uniformly distributed vacuum is supplied by the latticework when a vacuum is supplied to the die. The latticework and the means supporting the latticework are formed of the same material.

Figures 1, 2:
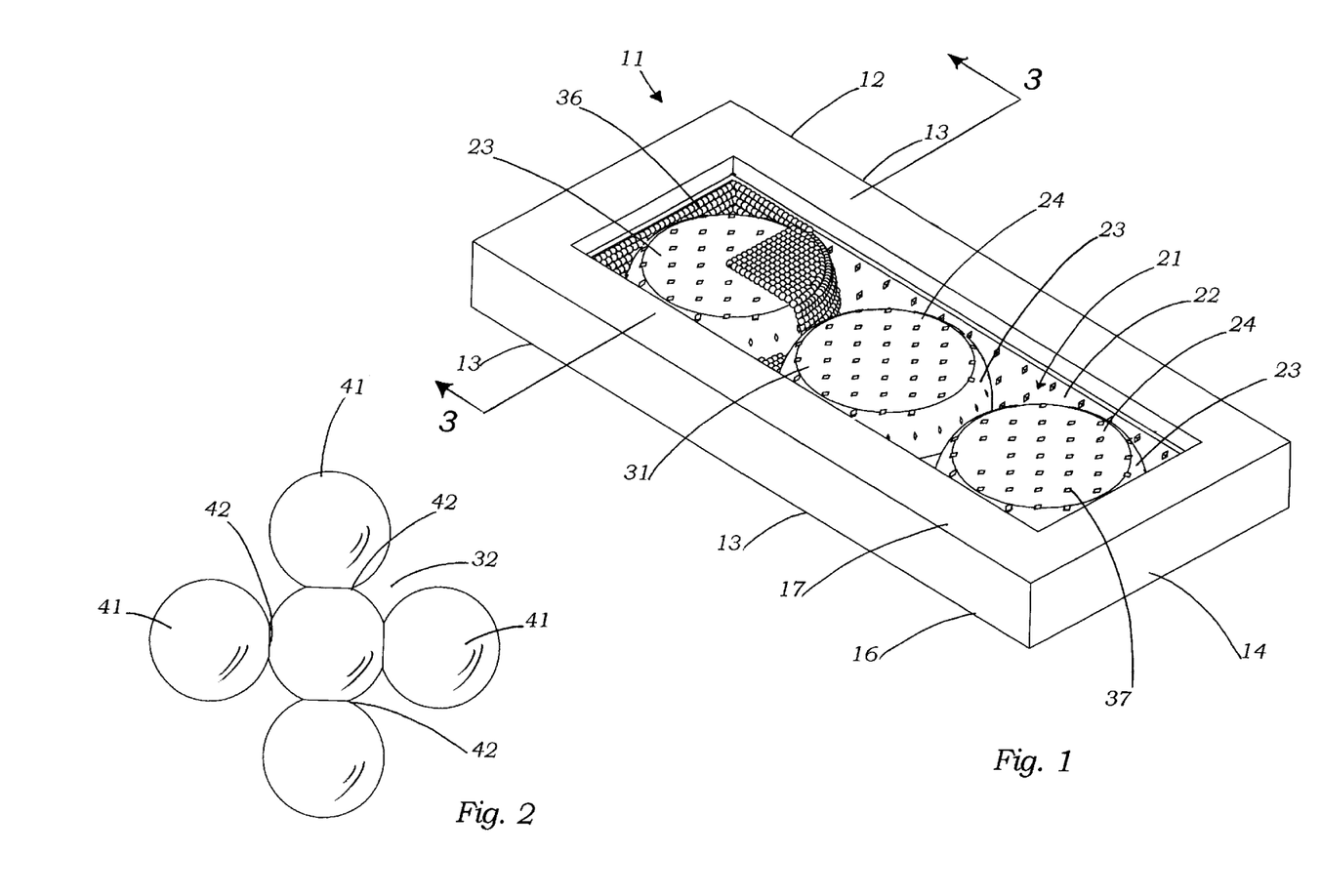
FIG. 1 is an isometric view of a mold or die with integral latticework incorporating the present invention.
FIG. 2 is greatly enlarged of the view of a portion of the latticework shown in FIG. 1 encircled by the line 2—2 of FIG. 1.
Figure 3:
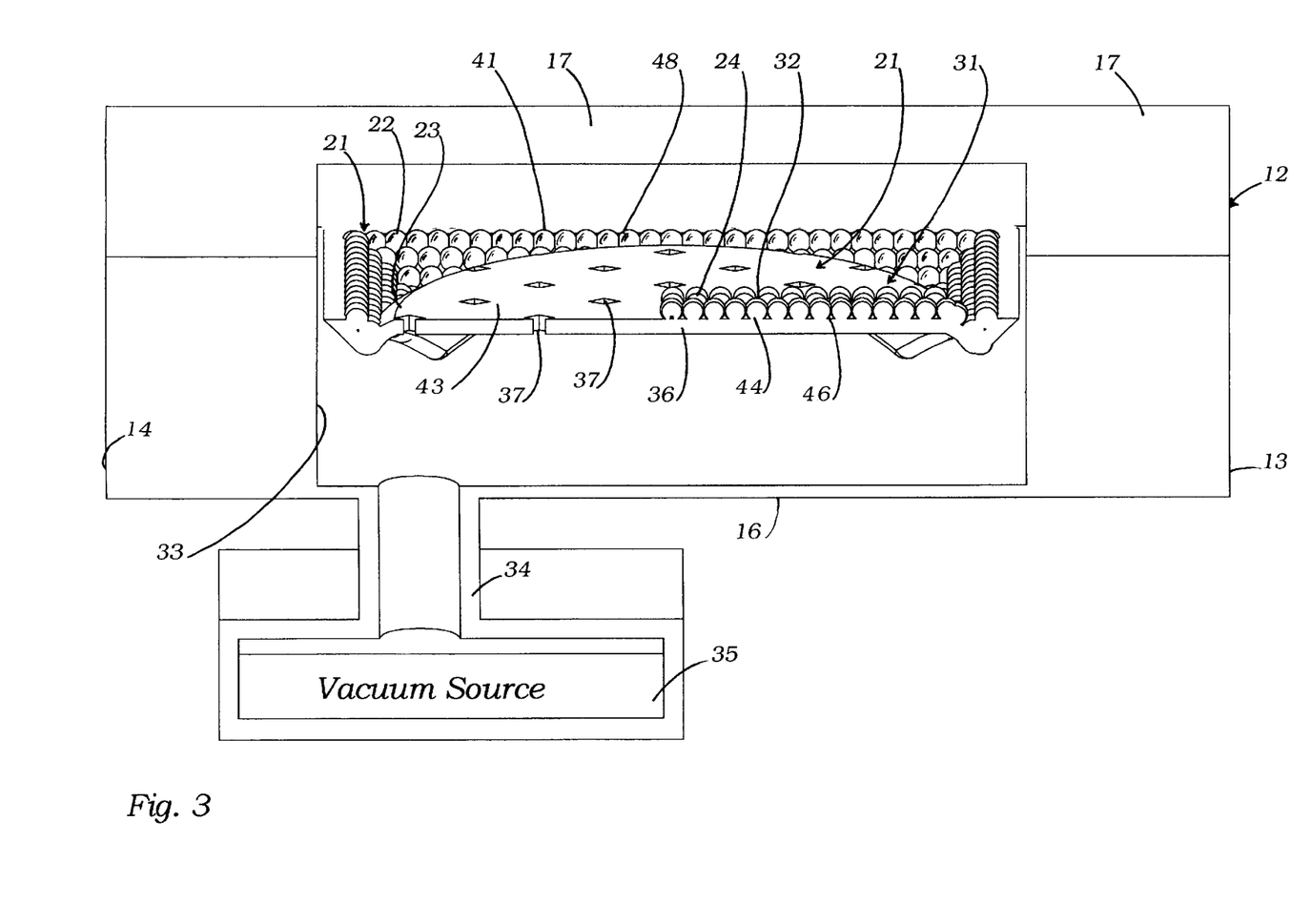
FIG. 3 is a cross-sectional view taken along line 3—3 of FIG. 1.

More in particular as shown in FIGS. 1, 2 and 3 of the drawings, the die or mold or tool 11 with integral screen or latticework consists of a body 12 formed of a suitable material which can be utilized in rapid prototyping and manufacturing technology and particularly those materials suitable for use with stereolithography. As is well known to those skilled in the art, selective laser sintering is utilized to create solid three-dimensional objects, layer by layer from plastic, metal or ceramic powders that are "sintered" or fused using laser energy. The body 12 as shown can be in the form of a parallelepiped having spaced-apart parallel side surfaces 13 and spaced apart parallel end surfaces 14 extending perpendicular to the side surfaces 13. The body 12 is also provided with a bottom surface 16 (FIG. 3) which extends at right angles to the surfaces 13 and 14 and a top surface 17 which extends at right angles to the side and end surfaces 13 and 14 and parallel to the bottom surface 16.

The top surface 17 of the body or block 12 has formed therein a complex die or mold surface 21 of a desired configuration as for example one which is recessed as shown. The mold surface 21 has complex shapes formed therein as for example curved or concave side walls 22 adjoining convex or truncated semi-spherical surfaces 23 which adjoin spaced apart circular planar surfaces 24 that lie in a common plane. This complex mold surface 21 has been shown in the drawings to depict how a mold surface which has complex curves therein can be provided in accordance with the present invention.

A screen or latticework 31 is provided which will serve as the mold surface 21 for making a molded pulp product as hereinafter described. The screen or latticework 31 is provided with a plurality of spaced-apart openings 32 which are spaced substantially uniformly across the mold surface 21 and generally lie in a plane having the conformation desired for the mold surface 21. The openings 32 are sized in such a manner so that the fibers from the pulp will not be pulled through the openings 32 but will build up to form the mold product on the screen or latticework 31 serving as the mold surface 21. The openings 32 are sized in such a manner so that a vacuum supplied to the underside of the screen or latticework 31 into a chamber 33 through a fitting 34 connected to a suitable vacuum source 35 will pull the fibers from the fiber slurry into contact with the screen or latticework 31 to form the molded pulp product. The size of the openings can range from 0.24" to 0.32" and can be of a desired configuration as for example circular, square or rectangular. The preferred size has been found to be approximately 0.24"×0.24" when utilized in connection with making molded products from fiber slurries made from recycled newspapers and the like.

Means is provided as a part of the body 12 in the form of a three-dimensional grid-like support structure 36 that provides a plurality of passages 37 extending through the grid-like structure and underlying the screen or latticework 31 with each of the passages being in communication with one or more openings 32 of the screen or latticework 31. The vacuum hereinbefore described is in communication with the passages 37 and in conjunction with the screen or latticework 31 supplies a vacuum which is substantially uniformly distributed over the mold surface 21.

In connection with the present invention, it has been found desirable to utilize the same material for forming the body 12, the latticework 31 and the grid-like support structure 36. In connection with the present invention it has been found to be particularly desirable to utilize polyamides and particularly Nylon because of its excellent heat and chemical resistance which are desirable qualities for the dies and tools made for producing molded pulp products of the present invention as hereinafter described. Two materials found to be particularly suitable are those supplied by DTM Corporation of Austin, Tex., U.S.A. and identified as Duraform™ Polyamide and Duraform GF (glass-filled) supplied by that corporation. In other applications, other materials supplied by that corporation can be utilized such as DuPont Somos® 201 TPE, TruForm™ Polymer, SandForm™ Zr II and Si Foundry Sands, Copper Polyamide and RapidSteel® 2.0.

In utilizing Nylon, the Nylon powder is spread as a thin uniform layer of a suitable thickness as for example 0.004" across the build area by forming a powder bed with the use of a leveling roller in a build chamber of suitable apparatus such as supplied by DTM Corporation of Austin, Tex., and identified as the Sinterstation® 2500$^{plus}$. A cross-section of the die or mold is selectively imaged by a computer driven program onto the layer of powder using laser energy which heats the powder to a temperature above its softening or melting temperature and thereby sintering or fusing the particles into a solid mass. The laser power is modulated so that only powder which conforms to the mold's geometry is fused. Progressive layers of powder are thereafter spread across the build area and rolled and imaged in the same manner until the complete mold has been imaged and formed. Thereafter the mold is removed from the build chamber and the loose unfused powder is removed to provide the finished mold.

In the specific construction shown in FIGS. 1, 2 and 3, the screen or latticework 31 is formed by the use of a plurality of uniformly shaped articles 41 in the form of spheres having at least four spaced-apart contact points 42 (see FIG. 2). These spheres can be of a suitable size as for example from 0.030" to 0.090" and preferably 0.060" to 0.070". The screen or latticework 31 formed by the articles 41 is supported by the grid-like support structure 36 in which the passages 37 extend through the grid-like support structure 36 which is provided with a surface 43 through which the passages 37 extend. The articles 41 make contact with the surface 43 at points 44 to define subways 46 which extend across the surface 43 in longitudinal and transverse directions in accordance with the pattern formed by the articles 41 so that the openings 32 between the articles 41 are in communication with the subways 46 and the subways 46 are in communication with the passages 37 in the grid-like support structure.

From the foregoing description it can be seen that the size of the openings 32 and the subways 46 can be readily changed by merely changing the size of the spherical articles 41. For the articles 41 instead of using spheres, it should be appreciated that other geometric shapes can be utilized as for example polyhedrons having six or more surfaces. Thus for example a polyhedron having eight surfaces with four planar surfaces at the top forming a four-sided pyramid and four surfaces at the bottom forming another four-sided pyramid with the two pyramids being joined together to provide an eight-sided polyhedron. Such an eight-sided polyhedron has four corners or points which lie in a plane which can be adjoined to corners of adjacent polyhedrons to thereby in effect provide a latticework which has openings 32 extending therethrough which are in communication with subways 46 that are in communication with the passages 37 of a grid-like support structure. Similarly, it can be seen that the articles can be formed as truncated polyhedrons as for example a four-sided pyramid with the bottom side of the pyramid facing upwardly to provide a planar surface having openings 32 therebetween and having subways 46 therebelow in communication with the passages 37 of a grid-like support structure 36. All of these various constructions can be readily formed utilizing the technology hereinbefore described.

Molds made in accordance with the present invention have been by way of example made of Duraform™ Nylon which is an FDA-approved grade Nylon which can readily accommodate operating temperatures of 300° F. It has been found, however, that the exterior surfaces of such molds since they are formed of Nylon which is originally in a powder state have in minutiae a rough surface which can inhibit the release of the that has been molded. To enhance the release characteristics of the mold, the exterior surface of the mold is coated with a heat-resistant material identified as Xylan™ which can withstand temperatures up to 450° F. Xylan is a fluorocarbon coating. This material is sprayed on in three successive layers, each of 2–3 mil in thickness and each layer being post-cured at 300° F. for 30 minutes on each layer. This coating 48 can be colored. Yellow has been selected as an appropriate color because it makes the fibers appearing on the mold to be more visible. It has been found that this coating 48 provides a very smooth, slippery surface which provides the mold with greatly enhanced release characteristics.

Figure 5:
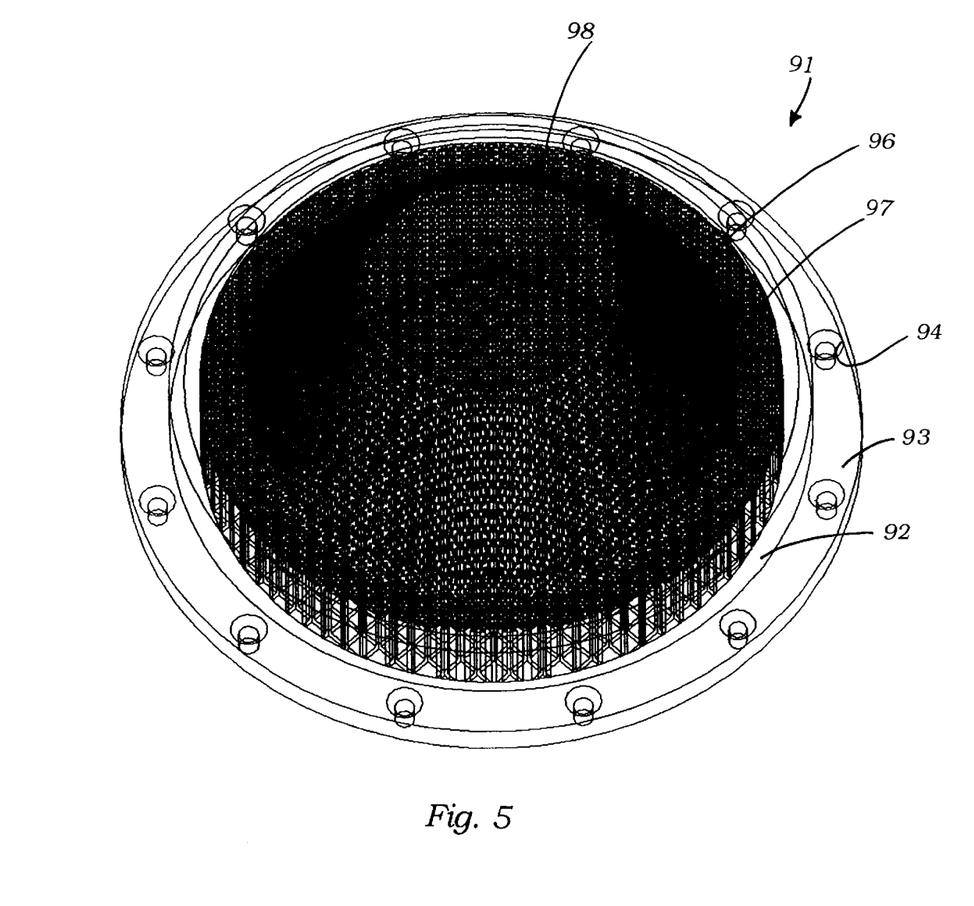
FIG. 5 is an isometric top view of another embodiment of a mold incorporating the present invention.
Figure 6:
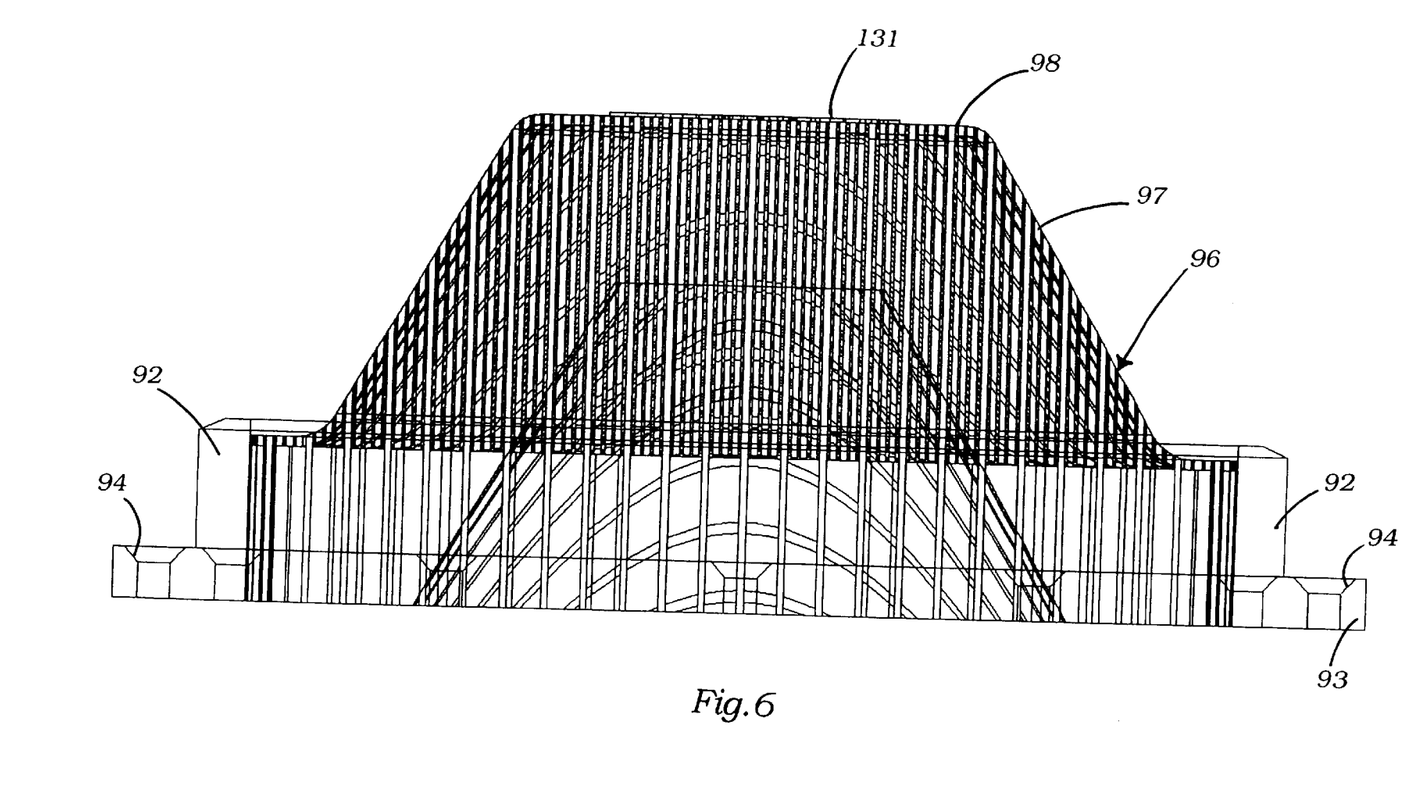
FIG. 6 is cross-sectional view taken along the line 6—6 of FIG. 5.
Figure 7:
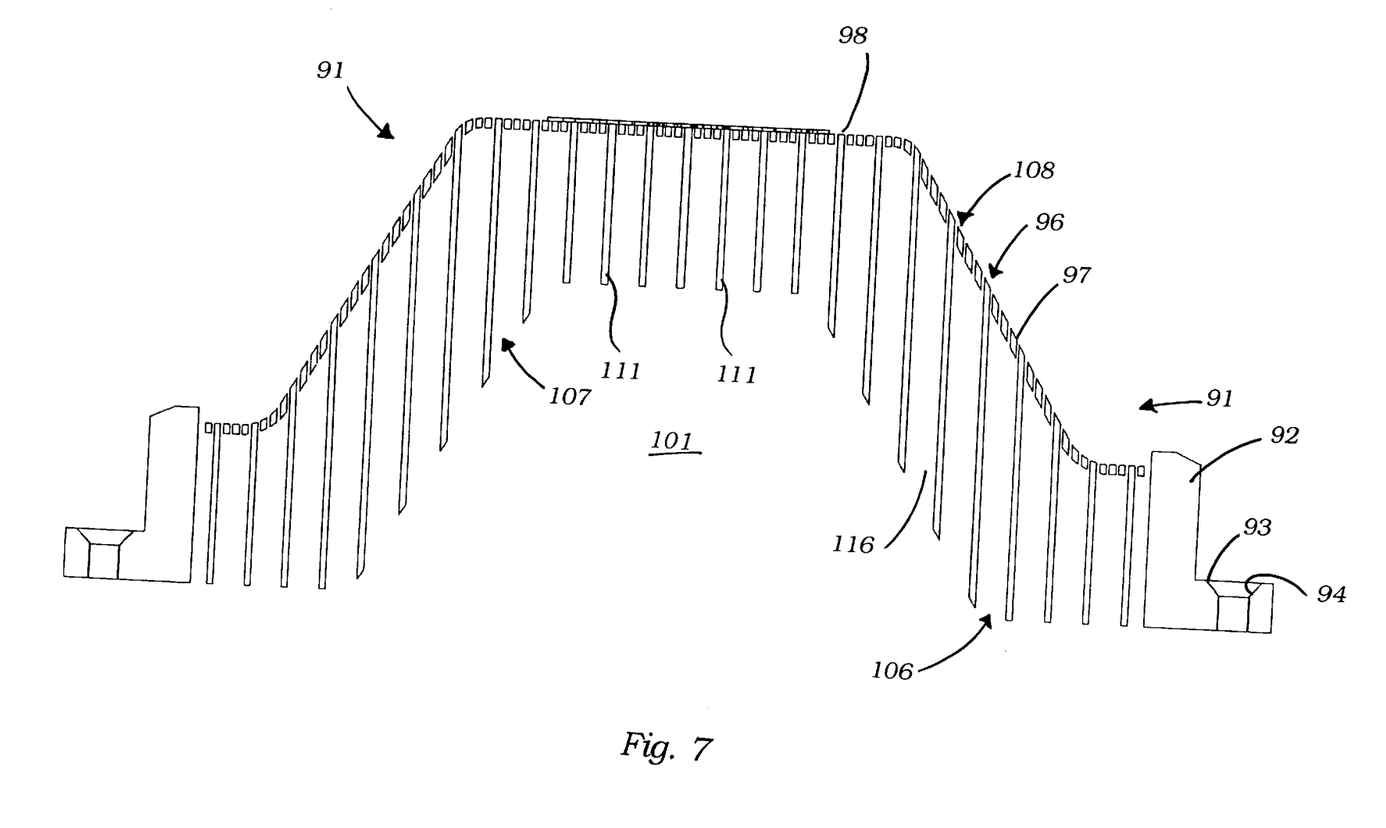
FIG. 7 is another cross-sectional view similar to FIG. 6 but only 0.0041" in thickness.

Another mold or tool incorporating the present invention is shown in FIGS. 5, 6 and 7. As shown therein, the mold 91 is formed of a suitable material such as the Duraform Nylon hereinbefore described by use of a Sinterstation as hereinbefore described. The mold 91 is provided with a circular frame 92 which is provided with a radially extending flange 93 having bolt holes 94 therein. The mold 91 is in the form of a truncated cone 96 which is provided with an inclined surface 97 and a planar circular surface 98 which adjoins the inclined surface 97. A truncated cone-shaped recess 101 is provided within the cone 96 and has a conformation generally corresponding to the cone 96 but of smaller dimensions so that there remains a body 106 which is supported by the frame 92. The body 106 includes a grid-line support structure 107 which is overlaid by a screen or latticework 108 which forms the outer surfaces 96 and 97 of the truncated cone 96.

Figure 8:
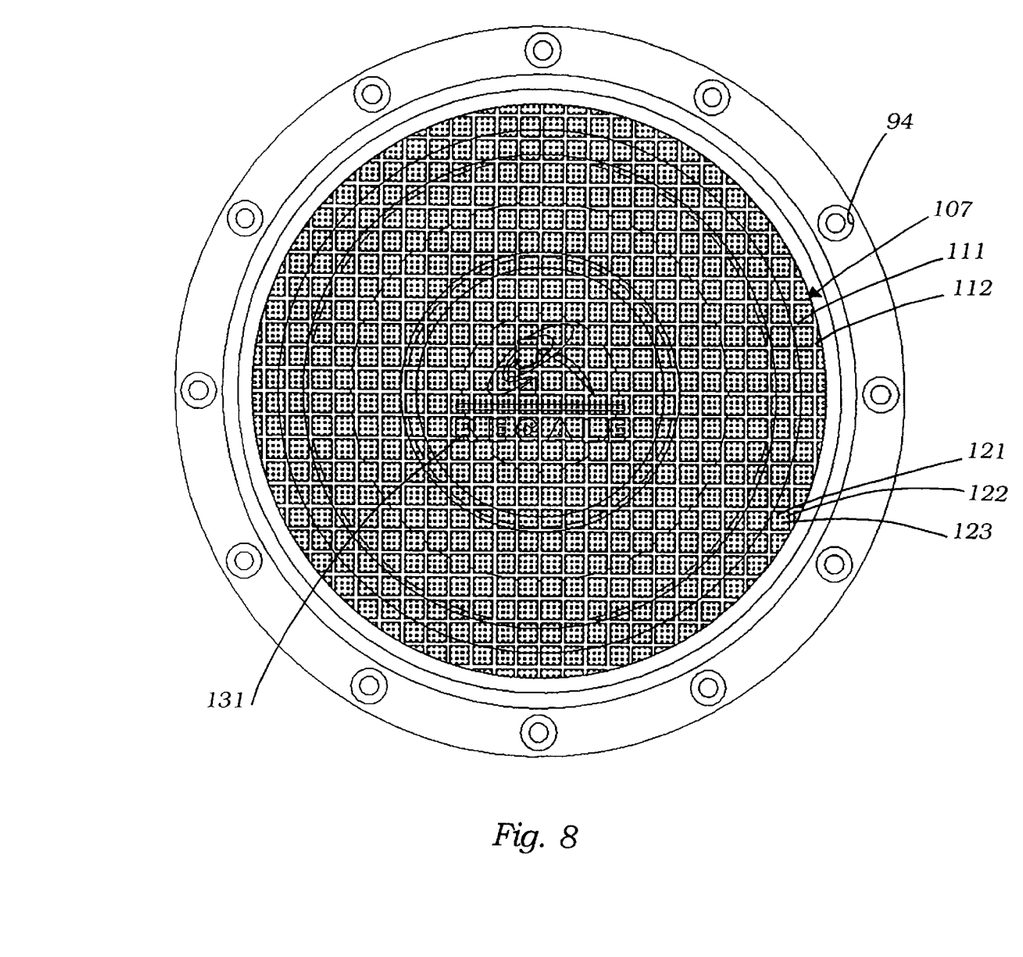
FIG. 8 is a bottom plan view of the mold shown in FIG. 5.

The grid-like support structure 107 is a plurality of spaced-apart parallel struts 111 extending in one direction and a plurality of additional spaced-apart struts 112 forming the grid-like support structure 107 (see FIG. 8). The struts can have a suitable thickness as for example 0.042" with the spaced between the struts in both directions being approximately ¼" to provide holes 116 which are rectangular in cross-section and have a suitable dimension as for example ¼" by ¼". These holes extend from the space provided by the cone-shaped recess 101 which is exposed to a vacuum and which extend to the screen or latticework 108. It can be seen that by providing the cone-shaped recess 101, the holes 116 have a length which is substantially equal so that the length of the flow passages for the vacuum to travel to the screen or latticework 108 is substantially the same to thereby provide a substantially uniform vacuum over the screen or latticework 108.

The screen or latticework 108 is formed of a single layer of material which is supported by the grid-like structure 107 which is shown in the top circular surface 98 and which is formed by a plurality of spaced-apart parallel struts 121 and a plurality of additional spaced-apart parallel struts 122 extending at right angles to the struts 121 to provide holes 123 between the same. These struts 121 and 122 can have a suitable thickness as for example 0.020" and having rectangular holes 123 therebetween of a suitable size as for example 0.02" by 0.020". This same type of hole pattern is continued down over the inclined surface 97. Because of this inclined surface, the holes 126 therein are in the form of inclined parallelograms and are of such a larger size as for example 0.0201" by 0.04". The struts are of a suitable thickness as for example 0.040".

A logo or other identification 131 can be provided on the top surface 98 which mold would be incorporated into the part made from the mold. If desired, this logo 131 can be imperforate. The struts 127 and 128 define the holes 126 are elliptical and form ellipses on the inclined surface 97.

A mating mold (not shown) can be prepared in a similar manner. The molds thus prepared can be coated with the coating of the type hereinbefore described to enhance the release characteristics for the mold. The mold 91 and its mating mold can be utilized in the apparatus shown in FIG. 4 and can be utilized in the same manner to produce molded parts therefrom. The molded parts produced from such molds have a very pleasing appearance which corresponds to the appearance of the exterior surface of the mold, thus providing a molded part which is precision molded and which also has a very pleasing, relatively smooth surface.

From the molds shown in FIGS. 6 through 8 it can be seen that very sophisticated molds can be prepared in accordance with the present invention within relatively short periods of time and at relatively low cost. Thus such molds can be utilized for short run molded products when that becomes necessary.

Figure 4:
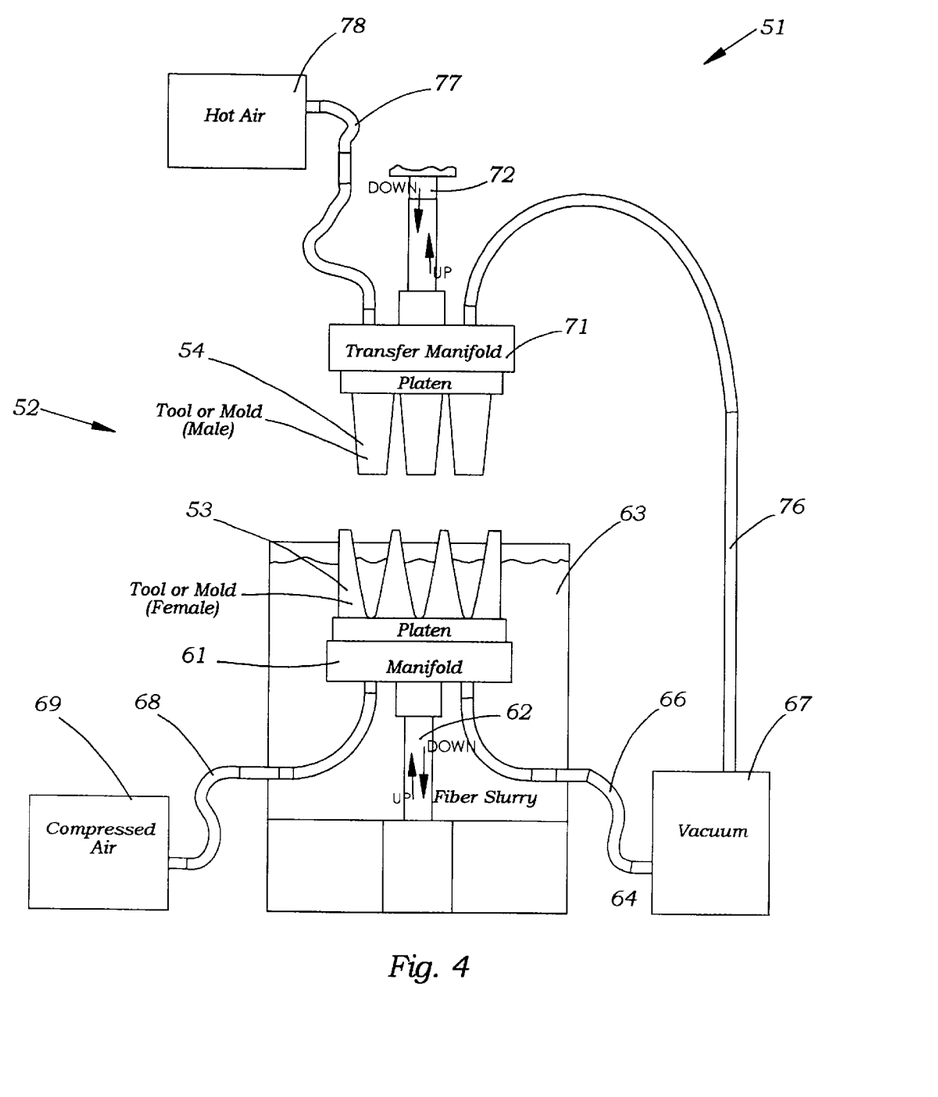
FIG. 4 is a schematic illustration of an apparatus incorporating the present invention utilizing the molds of the present invention for making molded products.

Molded pulp products of the desired configuration can be made in molded pulp product producing apparatus 51 as shown in FIG. 4. In such apparatus, a tool set 52 is required formed of a female mold or tool 53 and a mating male mold or tool 54. Such molds or tools can be readily prepared in accordance with the present invention. For example the desired part can be drawn utilizing a CAD data format in a conventional computer and transferring it by disk to an STL format to the Sinterstation® $2500^{plus}$ hereinbefore described. The surfaces to be generated for the female and male molds are obtained by selecting the appropriate surfaces of the part and then inputting the desired thickness for the molded part to provide the necessary space between the female and male molds. Both the female and male molds are then formed in the Sinterstation® $2500^{plus}$ by forming each of the molds with the screen or latticework 31 having the openings 32 therein and defining the surfaces of each mold.

The molds 53 and 54, after they have been prepared, are placed in the apparatus 52 by mounting the female mold 53 on a manifold 61 mounted on a plunger 62. The plunger 62 reciprocates vertically to bring the manifold 61 with its female mold 53 down into a fiber slurry 63 disposed in a holding tank 64 and out of the slurry 63. The manifold 61 is connected by piping 66 to a vacuum source 67. It is also connected by piping 68 to a source of compressed air 69.

The male mold or tool 54 is mounted on a transfer manifold 71 which is carried by a plunger 72 that also reciprocates vertically and is movable upwardly and downwardly with respect to the manifold 61. This transfer manifold 71 is connected by piping 76 to the vacuum source 67. It is also connected by piping 77 to a source of hot air 78.

The vacuum source 67 typically should be capable of producing a vacuum ranging from 26–29" of Hg with a preferable vacuum being approximately 28.51" of Hg. The hot air source 78 produces hot air under positive pressure at a temperature ranging from 250–310° F. with a preferred temperature of approximately 290° F. and a pressure ranging from 15 to 100 psi with preferably a pressure of approximately 50 psi.

The tool set 52 shown in FIG. 4 can be utilized for producing a molded pulp product which is capable of providing packaging for a fragile product such as champagne flutes. Such tool by way of example can be 9" in length, 5" in width and 6" in height.

In producing the molded pulp product, the manifold 61 is repeatedly lowered into the slurry 66. As soon as the manifold 61 and the female tool or mold 53 are completely immersed in the fiber slurry, a vacuum is supplied from the vacuum source 67 which vacuum is uniformly distributed throughout the tool 53 because of the porosity of the tool provided by the passages 32, 37 and 46 hereinbefore described. The uniformly distributed vacuum over the tool causes fibers to be withdrawn from the fiber slurry 66 and to be deposited substantially uniformly over the entire surface of the tool or mold 53. A sufficient thickness of fibers is collected onto the female mold 53 which can occur on a single immersion but if necessary after repeated immersions, with the vacuum being applied continuously. When the desired thickness of fibers has been achieved, the mold 53 is raised out of the slurry 63. At the same time, transfer manifold 71 is lowered so that male tool 54 carried thereby mates with female tool 53 to create a seal between the two tools while at the same time maintaining a void of the desired small dimensions between the female and male tools 53 and 54. The male tool 54 heated by the hot air from the hot air source 78 causes drying of the molded material carried in the female tool to dry the same while the vacuum is still being applied for removing the moisture which is being driven off from the molded material. The drying temperatures utilized of 300 ° F. can be readily accommodated by the Nylon forming the tools 53 and 54.

After the drying operation has been completed which typically can take place in 2 to 10 seconds and usually about 5 seconds, the vacuum from the vacuum source 67 is terminated. A burst of compressed air is also supplied at approximately the same time from the source 69 to the manifold to aid in lift off of the molded part from the female tool 53. Also at the same time separation of the molds 53 and 54 occurs typically by raising of the transfer manifold 71. A vacuum is supplied to the transfer mold 71 to aid in separation of the molded part from the female mold 53 and lifting of the molded part by the male tool 54. This separation of the molded part is greatly facilitated by the coating 48 applied to the exterior surface of the molds or tools. The hot air under pressure from the hot air source 78 is terminated immediately prior to lift off of the molded part. The transfer manifold 71 with the tool and the molded part carried thereby after it has been raised a sufficient distance can be shifted to overlie a conveyor belt (not shown) and thereafter, the vacuum can be released to permit the dried molded part to drop off of the transfer mold.

As explained previously, if the thickness of the molded pulp formed on the female tool 53 during the initial immersion into the fiber slurry does not produce a molded product of sufficient thickness, even before the drying step is undertaken, the manifold can be again lowered into the fiber slurry 66 to cause additional fibers to be picked up on the slurry by the use of the vacuum from the vacuum source 67. As soon as the desired thickness of the pulp material has been provided on the female tool 53, the drying step hereinbefore described can be accomplished.

From the foregoing it can be seen that there has been provided a new and improved die or mold with integral screen or latticework and a method for making the same which greatly facilitates the production of molds, particularly those requiring the use of screens used for forming molded pulp articles. Such dies can be economically and rapidly manufactured to make it possible to rapidly and readily produce different molded products having various conformations and shapes. The use of the spheres for forming the latticework is very desirable because they do not require orientation. However, as pointed out above, other uniformly shaped articles can be utilized to achieve similar results with the only difference being that they must be oriented with respect to the mold surface. Such orientation can be readily accomplished with a CAD (computer aided design) program generating the desired pattern. There also has been provided an apparatus and method for using the molds to produce molded products economically.

What is claimed:

1. A mold with integral screen comprising a body formed of a material having a surface, said body having a grid-like pattern of vacuum holes extending through the material and opening through said surface and permitting a vacuum to be supplied to said surface and a screen overlying said surface and having a plurality of holes therein of a greater number than the vacuum holes and in communication with the vacuum holes, said screen and said body being integral and being formed of the same material throughout.

2. A mold as in claim 1 wherein said material forming said body and said screen is a sintered material.

3. A mold as in claim 2 wherein said grid-like pattern is formed by a plurality of struts extending at angles with respect to each other and providing the vacuum holes extending to the screen.

4. A mold as in claim 3 wherein the screen is formed of a plurality of spaced-apart parallel struts extending at angles with respect to each other and defining the holes in the screen.

5. A mold as in claim 1 wherein said screen has a complex surface.

6. A mold as in claim 1 wherein said screen has an exterior surface and further includes a release coating disposed on the exterior surface of the screen.

7. A mold as in claim 6 wherein said release coating is formed of Xylan.

8. A mold as in claim 1 wherein said vacuum holes in said grid-like pattern have substantially the same length so as to provide a substantially uniform vacuum to the screen when a vacuum is applied to the mold.

9. A mold as in claim 1 wherein said mold is formed of a material which is capable of withstanding temperatures in excess of 300° F.

10. A mold as in claim 7 wherein said release coating is a heat resistant coating capable of withstanding a temperature of 430° F.

11. Apparatus for producing molded pulp products from a fiber slurry by the use of first and second mating molds being formed of a porous material and capable of withstanding temperatures in excess of 300° F., a first manifold for carrying the first mold and means for moving the first manifold and the first mold carried thereby into the fiber slurry for forming the molded part of molded pulp, means for applying a vacuum to the first manifold to cause a vacuum to be applied to the first mold when the first mold is immersed in the fiber slurry, a second transfer manifold mounting the second mold, means supplying heat to the second transfer manifold and the second mold, means for moving the second transfer manifold and the first manifold to bring the first and second molds into engagement with each other and out of contact with the fiber slurry, means for maintaining a vacuum on the second transfer manifold and the first manifold, means for applying heat to the second transfer manifold to cause drying of the molded pulp carried by the first mold to provide the molded part, means for causing relative movement between the second transfer manifold and the first manifold and means for at substantially the same time supplying compressed air to the first manifold to cause the molded part to be separated from the first mold and to move with the second transfer mold and means for thereafter releasing the vacuum on the second transfer manifold to permit separation of the molded part carried by the second transfer mold.

12. Apparatus as in claim 11 wherein said means for moving the first manifold is capable of immersing the first mold repeatedly into the fiber slurry until a sufficient thickness of fibers has been formed on the first mold for the molded part.

13. A method for forming a mold with an integral screen, generating by computer a latticework providing a mold surface having a plurality of openings therein and grid-like support means underlying and supporting the latticework and providing a plurality of passages extending upwardly to and in communication with the openings in the latticework, converting the computer program into a stereolithographic program for manufacturing the latticework and the grid-like support and means utilizing the stereolithographic program to form the latticework and the grid-like support means from the same material to provide an integral mold.

14. A method as in claim 13 wherein material is formed by providing a powder of a plastic material and sintering the powdered material utilizing the stereolithographic program.

15. A method for producing molded parts from a fiber slurry by the use of first and second mating porous molds, moving the first mold into the fiber slurry and supplying a vacuum to the first mold to cause fibers from the fiber slurry to form onto the first mold to a desired thickness, heating the second mold, mating the first and second molds and supplying a vacuum to the first and second molds during mating of the first and second molds and while heating is supplied to the second mold to cause solidification and drying of the fibers carried by the first mold until the fibers on the first mold are at least self-supporting to provide a molded part, ejecting the molded part formed by the fibers so that the molded part will travel with the second mold as the second mold is moved, moving the second mold and releasing the vacuum on the second mold to permit the molded part to be separated from the second mold.

16. A method as in claim 15 wherein compressed air is utilized for ejecting the molded part from the first mold.

17. Apparatus for producing a molded pulp product of a desired wall thickness from a fiber slurry, a platen, a porous mold including a body and a screen integral therewith and formed of the same material throughout mounted on the platen, moving the platen to move the mold into the fiber slurry, means for supplying a vacuum to the platen and to the porous mold at least during the time that the mold is disposed in the fiber slurry for causing fibers from the slurry to come into contact with the mold and adhere to the mold to provide a molded pulp product having the desired wall thickness, means for moving the platen to withdraw the mold from the fiber slurry while a vacuum is being maintained on the platen and the mold and means for supplying heat to the molded pulp product after it has been withdrawn from the fiber slurry for drying the molded product.

18. Apparatus as in claim 17 further including means for separating the molded product from the mold after the molded product has been dried.

19. A method for producing a molded part of a desired wall thickness from a fiber slurry by the use of a mold including a body and a screen integral therewith and formed of the same material throughout, moving the mold into the fiber slurry, supplying a vacuum to the mold while the mold is disposed in the fiber slurry to cause fibers from the slurry to adhere to the mold to provide a molded part having the desired wall thickness, removing the mold from the fiber slurry while maintaining the vacuum on the mold and supplying heat to the molded fibers of the molded part to dry the molded part.

20. A method as in claim 19 further including the step of separating the molded part from the mold.

21. A mold as in claim 1 wherein said material is non-metallic.

22. A mold as in claim 21 wherein said material is a sintered plastic material.

* * * * *